US008663010B2

(12) United States Patent
Thomas et al.

(10) Patent No.: US 8,663,010 B2
(45) Date of Patent: Mar. 4, 2014

(54) REMOTE GAME PROCESSING

(75) Inventors: Alfred Thomas, Las Vegas, NV (US); Christopher J. Frattinger, Sparks, NV (US); Terry D. Warkentin, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 1768 days.

(21) Appl. No.: 11/335,440

(22) Filed: Jan. 19, 2006

(65) Prior Publication Data

US 2006/0205511 A1 Sep. 14, 2006

Related U.S. Application Data

(60) Provisional application No. 60/656,986, filed on Feb. 28, 2005.

(51) Int. Cl.
*A63F 13/00* (2006.01)

(52) U.S. Cl.
USPC .......... 463/42

(58) Field of Classification Search
USPC .......... 463/42
See application file for complete search history.

(56) References Cited

U.S. PATENT DOCUMENTS

| | | | | |
|---|---|---|---|---|
| 4,335,809 | A | 6/1982 | Wain | |
| 4,494,197 | A | 1/1985 | Troy | |
| 4,624,462 | A | 11/1986 | Itkis | |
| 4,856,787 | A | 8/1989 | Itkis | |
| 5,326,104 | A | 7/1994 | Pease | |
| 5,586,937 | A | 12/1996 | Menashe | |
| 5,707,286 | A | 1/1998 | Carlson | |
| 5,779,545 | A | 7/1998 | Berg | |
| 6,210,274 | B1 | 4/2001 | Carlson | |
| 6,272,223 | B1 | 8/2001 | Carlson | |
| 6,409,602 | B1 * | 6/2002 | Wiltshire et al. | 463/42 |
| 6,428,413 | B1 | 8/2002 | Carlson | |
| 6,533,664 | B1 | 3/2003 | Crumby | |
| 6,628,939 | B2 | 9/2003 | Paulsen | |
| 6,790,143 | B2 | 9/2004 | Crumby | |
| 6,846,238 | B2 | 1/2005 | Wells | |
| 6,866,584 | B2 | 3/2005 | Michaelson | |
| 6,887,151 | B2 | 5/2005 | Leen | |
| 6,945,870 | B2 | 9/2005 | Gatto | |
| 6,986,055 | B2 | 1/2006 | Carlson et al. | |
| 6,988,946 | B2 | 1/2006 | Michaelson | |
| 7,260,834 | B1 | 8/2007 | Carlson | |
| 2002/0068631 | A1 | 6/2002 | Raverdy | |
| 2002/0098888 | A1 | 7/2002 | Rowe | |
| 2002/0147049 | A1 | 10/2002 | Carter, Sr. | |
| 2003/0100371 | A1 | 5/2003 | Gatto et al. | |
| 2004/0087370 | A1 | 5/2004 | Tarantino | |

(Continued)

FOREIGN PATENT DOCUMENTS

| | | | |
|---|---|---|---|
| GB | 2151054 | A | 7/1985 |

*Primary Examiner* — Melba Bumgarner
*Assistant Examiner* — Thomas H Henry
(74) *Attorney, Agent, or Firm* — Nixon Peabody LLP

(57) ABSTRACT

Techniques and systems for remote gaming are presented. Gaming applications reside and process on portable gaming cards and the portable gaming cards are remote from the gaming terminal. Moreover, the portable gaming cards are interfaced to a gaming system processor, which facilitates the processing of the gaming applications. Interactions with the gaming terminal result in the remote and portable gaming card processing an appropriate gaming application. The results produced are communicated back to the gaming terminal. Furthermore, the results may alter multimedia presented or played on the gaming terminal.

20 Claims, 3 Drawing Sheets

(56) References Cited

U.S. PATENT DOCUMENTS

| | | | |
|---|---|---|---|
| 2004/0209660 | A1 | 10/2004 | Carlson et al. |
| 2005/0054445 | A1 | 3/2005 | Gatto et al. |
| 2005/0059494 | A1 | 3/2005 | Kammler |
| 2005/0113172 | A1 | 5/2005 | Gong |
| 2005/0193209 | A1 | 9/2005 | Saunders et al. |
| 2005/0209006 | A1 | 9/2005 | Gatto |
| 2005/0209007 | A1 | 9/2005 | Gatto |
| 2005/0221898 | A1 | 10/2005 | Gatto |
| 2005/0233811 | A1 | 10/2005 | Gatto |
| 2006/0019749 | A1 | 1/2006 | Merati |
| 2006/0165235 | A1 | 7/2006 | Carlson |
| 2006/0189383 | A1 | 8/2006 | Bird |
| 2006/0189390 | A1 | 8/2006 | Bird |
| 2006/0189391 | A1 | 8/2006 | Bird |
| 2008/0015010 | A1 | 1/2008 | Bird |
| 2008/0015016 | A1 | 1/2008 | Bird |
| 2008/0015019 | A1 | 1/2008 | Bird |
| 2008/0015026 | A1 | 1/2008 | Bird |
| 2008/0015027 | A1 | 1/2008 | Bird |
| 2008/0015028 | A1 | 1/2008 | Bird |
| 2008/0015029 | A1 | 1/2008 | Bird |
| 2008/0026849 | A1 | 1/2008 | Bird |
| 2008/0026850 | A1 | 1/2008 | Bird |
| 2008/0032802 | A1 | 2/2008 | Bird |
| 2008/0045345 | A1 | 2/2008 | Bird |

* cited by examiner

REMOTE GAME PROCESSING

RELATED APPLICATION

This application claims priority under 35 U.S.C. 119(e) from U.S. Provisional Application Ser. No. 60/656,986 filed Feb. 28, 2005, which application is incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

FIELD

The invention relates generally to gaming communication and processing, and more particularly to techniques for remotely communicating and processing gaming applications.

BACKGROUND

The gaming industry has been exploding with growth in recent years. As a result, a variety of new types of gaming machines have emerged in the marketplace. These machines are increasingly equipped with processors and memory and run a variety of software applications.

Gaming applications are processed on these machines. The gaming applications represent wagering games which players interact with on the hopes that money may be won. Furthermore, gaming establishments often attempt a variety of marketing measures in an effort to draw attention to a particular wagering game and its corresponding machine. One popular approach is to regularly move selective machines to selective locations throughout the gaming establishment where it is believed the machines will generate better revenue from the players. However, when machines are physically moved, they are not operational, and they are therefore not generating revenue. Human resources are also required to move the machines around, which adds expenses for the gaming establishment.

Additionally, a single version of a gaming application may be installed and executing on a plurality of different machines throughout a gaming establishment. Accordingly, when upgrades, patches, or maintenance operations are necessary for a version of a gaming application, the operations must be repetitively performed on all the machines having that version of the gaming application. This repetitive work results in down time for the machines and thus lost revenues for the gaming establishment.

Therefore, there is a need for an improved technique or architecture for processing gaming applications.

SUMMARY

In various embodiments, remote game processing techniques are presented. Gaming cards are portable, external, and remote to gaming terminals. The gaming cards are interfaced to a gaming system processor. Moreover, the gaming cards are interchangeable within interface locations associated with the gaming system processor. Each of the interface locations, within the gaming system processor, corresponds to a particular one of the gaming terminals.

The gaming cards house and/or process gaming applications in cooperation with the gaming system processor. Interactions with the gaming terminals are communicated over a network to the appropriate gaming cards, where the interactions are processed by gaming applications. Results are communicated back to the appropriate gaming terminals, and the results may alter presentations and/or other multimedia (e.g., audio, video, graphics, images, text, etc.) within the gaming terminals.

DETAILED DESCRIPTION

Figure 1:
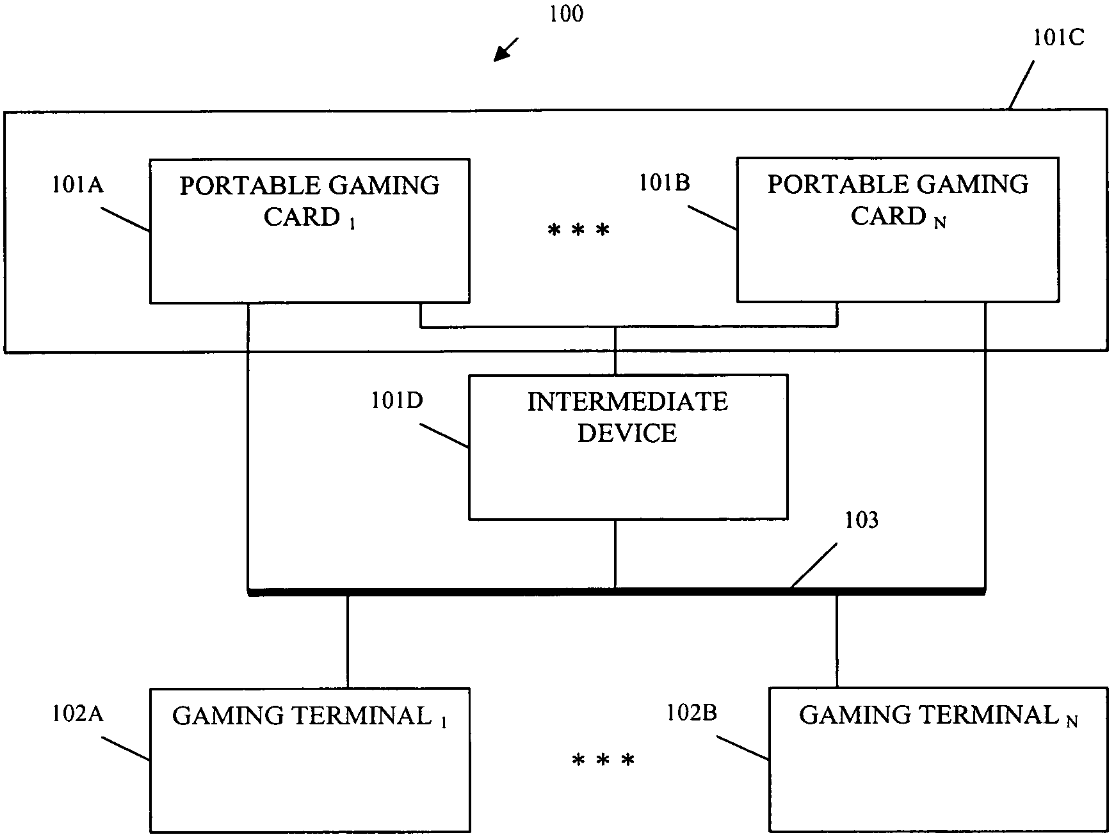
FIG. 1 is a diagram of a remote gaming system, according to an example embodiment.

FIG. 1 is a diagram of a remote gaming system 100, according to an example embodiment. The remote gaming system 100 is implemented in a machine-accessible and readable medium and is operational over a network. In an embodiment, the remote gaming system 100 implements, among other things, the processing of method 200 and 300 of FIGS. 2 and 3, respectively.

The remote gaming system 100 includes a portable gaming card 101A and a gaming terminal 102A. The portable gaming card 101A is interfaced to a gaming system processor 101C. In some embodiments, the remote gaming system 100 may also include a plurality of additional portable gaming cards 101B interfaced to the gaming system processor 101C, a plurality of additional gaming terminals 102B, and/or an intermediate device 101D.

As used herein a "gaming card" 101A-101B refers to an apparatus, such as a board, a memory module, a cartridge, or a circuit, which is adapted to house, play, and/or execute games associated with wagering (i.e., wagering game or gaming application). In an embodiment, a single gaming card 101A-101B includes a single gaming application. The gaming card 101A-101B may include memory, storage, and a processor. Alternatively, the gaming card 101A-101B may include memory and/or storage and be accessible to a processor, but may not actually include the processor. In this latter case, the processor may be associated with the gaming system processor 101C.

The gaming card 101A-101B plugs into or is interfaced with the gaming system processor 101C. The gaming card 101A-101B is portable; meaning that a particular gaming card 101A-101B may be removed from one slot of the gaming system processor 101C and plugged into another slot of the gaming system processor 101C.

In an embodiment, the gaming system processor 101C is a rack or jukebox which has a plurality of slots that gaming cards 101A-101B plug into. Here, the gaming cards 101A-101B are physically or logically arranged in a rack or jukebox device. The rack permits a plurality of the gaming cards 101A-101B to be centrally located and managed. Each of the slots within the rack houses a particular one of the gaming cards 101A-101B. Gaming cards 101A-101B may be dynamically removed from slots or added to empty slots. Each slot includes a unique address, identity, or location within the rack. Mappings between gaming cards 101A-101B and corresponding gaming terminals 102A-102B may be stored in lookup tables, in policies, in profiles, in configurations, etc.

Associations between gaming cards 101A-101B, gaming applications, and gaming terminals 102A-102B are achieved via logical mappings and configurations, such that gaming terminals 102A-102B may dynamically be associated with new gaming application or gaming cards 102A-102B. Moreover, policies or tables may be used to change these associations, and these policies and/or tables may reside external to the gaming terminals 102A-102B. Additionally, some policies may group selective gaming terminals 102A-102B to be associated with a single or selective grouping of gaming cards 101A-101B.

Configuration files or gaming terminal 102A-102B profiles may map a specific gaming terminal 102A-102B to a specific gaming card 101A-101B or specific slot within the gaming system processor 101C. Additionally, tables or other data structures may be used to create the mapping. In some embodiments, the mapping may be resolved dynamically and selectively. For example, the gaming terminal 102A-102B may present itself to an intermediate device 101D with a set of features associated with its player interface and based on this information the intermediate device 101D identifies one or more gaming applications associated with gaming cards 101A-101B that the gaming terminal 102A-102B may communicate with. In this manner, the mapping may be dynamically and selectively determined by a player interacting with the gaming terminal 102A-102B. It should also be noted that the player interface features may be determined based on an identity of a specific gaming terminal 102A-102B or based on an identity associated with the specific player interface (e.g., make, model, version, etc.).

Furthermore, because gaming applications are centrally located within gaming cards 101A-101B which are interfaced to a gaming system processor 101C, maintenance may be more securely and easily achieved. In other words, changes to gaming applications do not have to be propagated and repeated by physically visiting each affected gaming terminal 102A-102B on a casino floor, since each affected gaming terminal 102A-102B does not store a copy of the gaming application and since each affected gaming terminal 102A-102B gets its gaming application from a central source, the gaming processor 101C having the gaming cards 101A-101B.

In another embodiment, the remote gaming system 100 includes an intermediate device 101D. The intermediate device 101D may be a router, proxy, firewall, gateway, and/or server. The intermediate device 101D is adapted to intercept and process interactions between the gaming terminals 102A-102B and the gaming cards 101A-101B. This is useful for a variety of reasons. For example, the intermediate device 101D may be used to interface generic gaming terminals 102A-102B to legacy gaming cards 101A-101B and legacy gaming applications. As another example, the intermediate device 101D may be used to centrally manage and control access to the gaming cards 101A-102B. Additionally, the intermediate device 101D may be used for purposes of enforcing authentication and other security measures to ensure the integrity of operations and the security of the gaming cards 101A-101B.

According to another embodiment, a gaming application of a particular gaming card 101A-101B is loaded and immediately available from memory of the gaming card 101A-101B when requested by a gaming terminal 102A-102B. Thus, there is no startup latency associated with initially accessing a particular gaming application, since each available gaming application may be loaded in memory of its gaming card 101A-101B and available on demand from a particular slot of the gaming system processor 101C. Moreover, in this embodiment the gaming system processor 101C may provide a processor or pool of processors that are external to the gaming cards 101A-101B and which permit the gaming applications to be processed within the environment of the gaming system processor 101C.

Additionally, in an embodiment, gaming applications are distributed to gaming establishments on the portable gaming cards 101A-101B; rather than by download. This provides a physical inventory for a casino establishment, which may be tracked and monitored as traditional physical assets are tracked and monitored within the establishment. Although, in some embodiments, the gaming applications may still be initially acquired, updated, patched, or upgraded via an automatic download from a remote server site and onto the gaming cards 101A-101B.

A "gaming terminal" 102A-102B includes processor and memory capabilities. Although, in some embodiments, these capabilities are intentionally circumscribed within a gaming terminal 102A-102B. The gaming terminal 102A-102B may also include a display monitor, graphics processor, and/or audio capabilities. The gaming terminal 102A-102B also includes a value input device and/or dispensing device for purposes of accepting value input (e.g., money, winning tickets, loyalty credits, etc.), for purposes of dispensing value output, and the like. The gaming terminal 102A-102B is also equipped with a player interface (e.g., controls, buttons, levers, touch screen inputs, etc.). In some embodiments, the gaming terminal 102A-102B also includes other peripheral devices, such as a media reader for receiving data input. The data input may be associated with a technician and/or administrator who directly interact with the gaming terminal 102A-102B.

The gaming terminals 102A-102B themselves are just "smart-enough" (SE) to communicate interactions and process responses from a gaming application for purposes of displaying modified presentations, playing multimedia, and communicating game outcomes. Thus, gaming terminals 102A-102B may be viewed as emulator devices that act as an interface to remote gaming applications that actually process and control wagering games from remote gaming cards 101A-101B which are interfaced to a gaming system processor 101C.

Furthermore, the gaming terminal 102A-102B is adapted to be networked directly or indirectly to a gaming card 101A-101B. The gaming card 101A-101B does not have to be physically proximate to the gaming terminal 102A-102B. That is, the gaming card 101A-101B may be geographically dispersed from the gaming terminal 102A-102B.

In an embodiment, the gaming terminal 102A-102B and gaming card's 101A-101B network connection is a Local Area Network (LAN) connection. In still another embodiment, the network connection is peer-to-peer (P2P), such that the gaming terminal 102A-102B and gaming card 101A-101B are directly connected to one another over the network. An indirect network connection may occur when the gaming terminal 102A-102B directly communicates through an intermediate device 101D, such as a server, proxy, firewall, gateway, etc. and the intermediate device 101D directly communicates with the gaming card 101A-101B on behalf of the gaming terminal 102A-102B.

Communications between the gaming terminals 102A-102B and the gaming cards 101A-101B occur over a network 103. The network 103 may be wired, wireless, or a combination of wired and wireless. For example the connections between the gaming terminals 101A-101B and an optional intermediate device 101D may be wireless while the connections between the intermediate device 101D and the gaming cards 101A-101B may be wired. In other cases all connections of the remote gaming system 100 are wired. In yet other arrangements, all connections of the remote gaming system 100 are wireless.

Players and/or technicians interact with a player/technician interface affixed to the gaming terminal 102A-102B for purposes of playing wagering games (gaming applications) or for purposes of performing gaming administrative services, respectively. The interactions activated by controls of the interface are communicated via a network 103 from the gaming terminal 102A-102B to a specific gaming card 101A-101B. Results associated with the interactions are communicated back over the network 103 to the gaming terminal 102A-102B where display presentations, audio, graphics, images, and/or textual information are altered in response to the results.

Players also interact with the gaming terminals 102A-102B on a floor of a gaming establishment, but do not directly interact with the gaming applications or gaming cards 101A-101B that process those gaming applications. This provides a higher degree of security to gaming establishments for purposes of controlling and monitoring gaming outcomes. It also provides for improved flexibility by permitting dynamic modifications to the mappings between specific gaming terminals 102A-102B and specific gaming applications (via the gaming cards 101A-101B).

Figure 2:
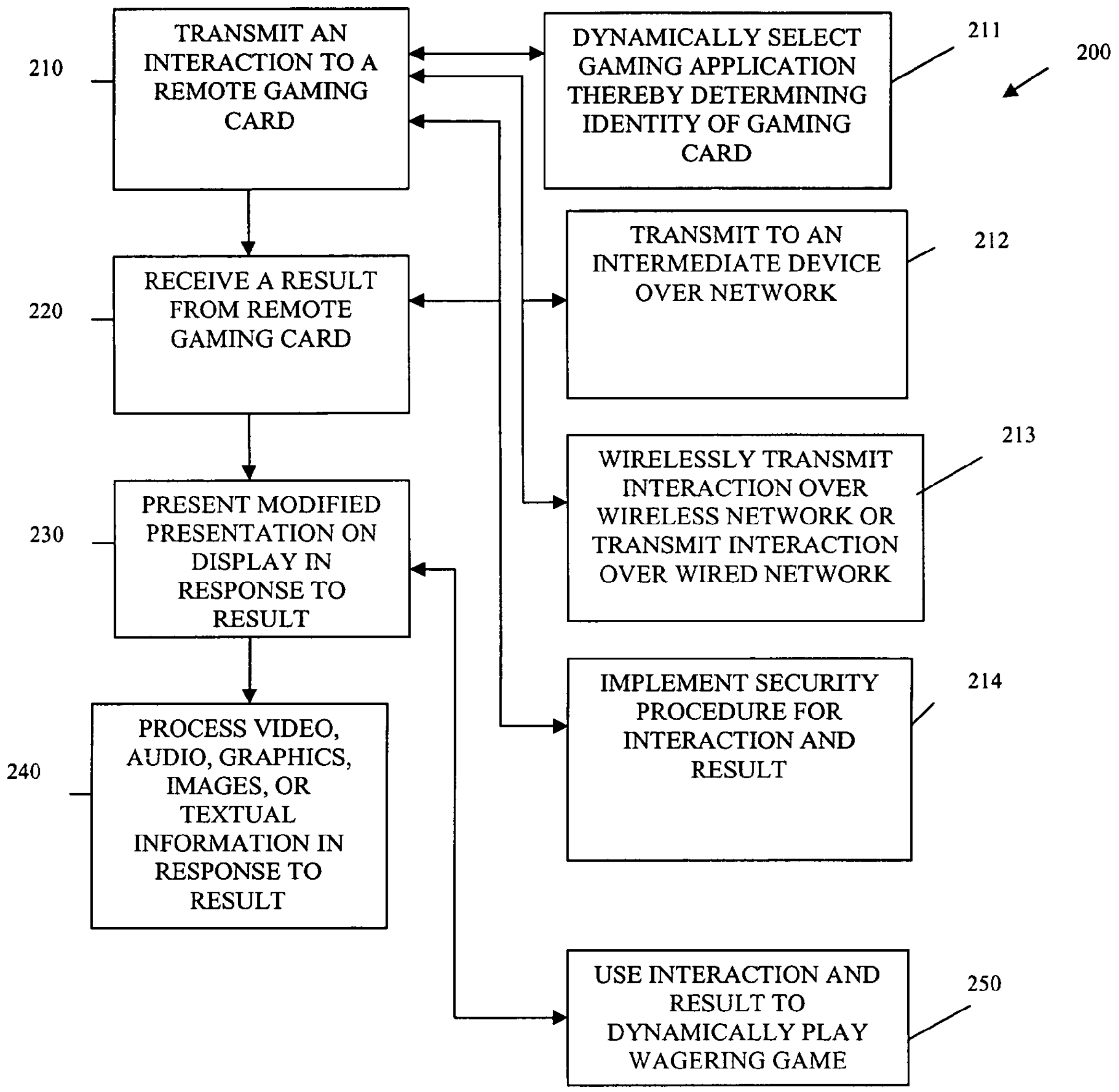
FIG. 2 is a diagram of method for remote gaming, according to an example embodiment.

FIG. 2 is a diagram of method 200 for remote gaming, according to an example embodiment. The method 200 (herein after "remote gaming service") is implemented in a machine-accessible and readable medium and is operational over a network.

In an embodiment, the remote gaming service executes within a gaming terminal device having some memory and processing capabilities. One such gaming terminal device 102A-102B was presented above with respect to the remote gaming system 100 of FIG. 1.

At 210, the remote gaming service transmits an interaction to a remote gaming card over a network. An example remote gaming card 101A-101B was presented above with the remote gaming system 100 of FIG. 1. The remote gaming card is interfaced to a gaming system processor, such as the gaming system processor 101C presented above with the remote gaming system 100 of FIG. 1. The gaming system processor is adapted to house a plurality of additional remote gaming cards.

In an embodiment, at 211, the remote gaming service may interact with a player for purposes of receiving a game selection. Each game selection is associated with a particular gaming application, and each gaming application is associated with a particular gaming card interfaced in a particular slot of the gaming system processor. In this manner, the mapping between the gaming service and the device on which it processes (gaming terminal) may be dynamically resolved when a player selects a particular game selection. By selecting a game, the gaming service can dynamically resolve the identity of the particular gaming card with which the gaming service will interact.

In another embodiment, at 212, the remote gaming service may indirectly transmit the interaction over the network to the remote gaming card. In other words, at 212, the remote gaming service directly transmits an interaction directed to a particular remote gaming card via an intermediate device. An example intermediate device 101D was presented above with respect to the remote gaming system 100 of FIG. 1. The intermediate device may act as an intermediary for communications directed to the gaming card and for communications directed from the gaming card. This arrangement may be particularly useful when a plurality of gaming cards (housed within a gaming system processor) and gaming terminals are networked together over the network, such that the intermediate device resolves identities and mappings between the participants of the network (gaming cards and gaming terminals).

At 213, the communications occurring over the network may be wireless or wired. Thus, in an embodiment, the remote gaming service is adapted within a gaming terminal to wirelessly communicate with and wirelessly receive communications from a remote gaming card. Alternatively, communications may be hardwired. In still other embodiments, communications may be a combination of wireless and wired, such as when an intermediate device is deployed and the gaming card is wired to the intermediate device but the gaming terminal is not wired to the intermediate device.

In yet another embodiment, at 214, the remote gaming service may implement security policies for transmitting the interaction and for receiving the result. Some example security policies may include such things as authentication, encryption, and decryption.

At 220, the remote gaming service receives a result from the remote gaming card over the network. The result may be associated with game play of a gaming application which is executing on the remote gaming card or on the gaming system processor in cooperation with the remote gaming card. Alternatively, the result may be associated with some administrative interface which is being performed remotely by an administrator via the remote gaming terminal. The result may be a stream of data that the remote gaming service processes to present image, graphics, video, and/or play audio. The result may also include a game outcome (loss or win).

At 230, the remote gaming service processes the result received from the remote gaming card for purposes of presenting on a display a modified presentation. In other words, game state or administrative state is reflected back to the player or administrator via a display associated with the gaming terminal. The actual state was produced remotely at the remote gaming card, but the communication or presentation of the state is made locally to the player or administrator who is interacting with controls of the gaming terminal.

In some cases at 240, processing the result entails processing video, graphics, images and/or textual information within the gaming terminal, such that the modified presentation is adequately achieved. Thus, a variety of processing may occur on the gaming terminal in response to the result received from the remote gaming card over the network.

In an embodiment, at 250, the interaction and the result are consumed or used by a player interacting with the gaming service on a gaming terminal for purposes of dynamically playing a wagering game. That is, the processing of the remote gaming service interacts with a player interfaced to a gaming terminal for purposes of allowing the player to wager on games where those games are executed remotely over the network on remote gaming cards interfaced to a gaming system processor.

Figure 3:
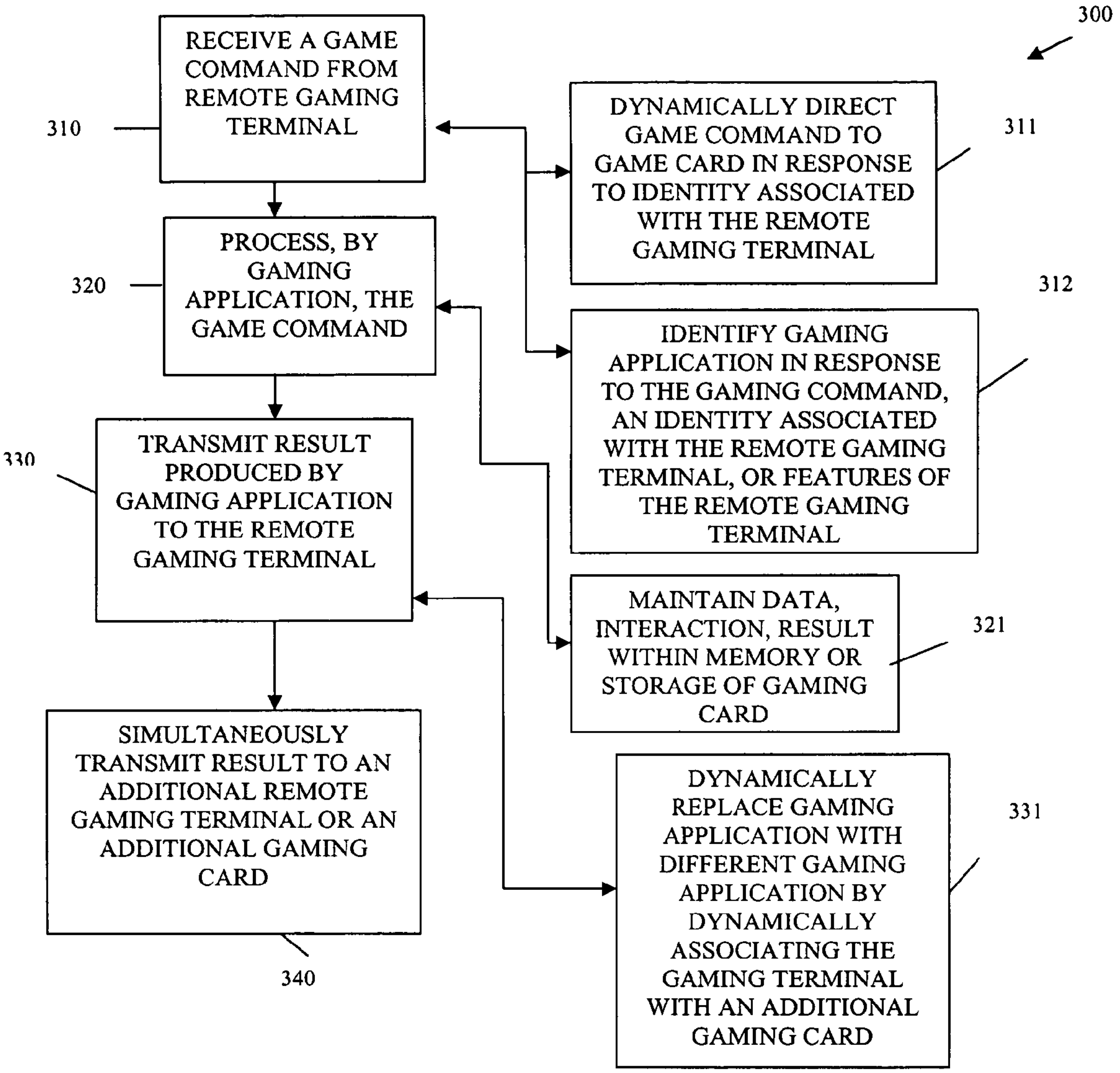
FIG. 3 is a diagram of another method for remote gaming, according to an example embodiment.

FIG. 3 is a diagram of another method 300 for remote gaming, according to an example embodiment. The method 300 (hereinafter "remote gaming card service or gaming card service") is implemented in a machine-accessible and readable medium and is operational over a network. In an embodiment, the remote gaming card service interacts with the method 200 depicted in FIG. 2 over a network.

In another embodiment, the remote gaming card service is implemented within a portable gaming card. The portable gaming card has or is capable of processing a single gaming application. An example portable gaming card 101A-101B was presented above with respect to the remote gaming system 100 of FIG. 1.

In another embodiment, the remote gaming card service is implemented within an intermediate device, such as a router, proxy, server, and/or firewall, and is adapted to communicate with selective gaming cards processing selective gaming applications. An example intermediate device 101D was presented above with respect to the remote gaming system 100 of FIG. 1.

In still another embodiment, the remote gaming card service is implemented within a gaming system processor, such as the gaming system processor 101C of the remote gaming system 100 of FIG. 1.

Therefore, the remote gaming card service may be implemented within a gaming card, within an intermediate device, or within a gaming system processor.

At 310, the gaming card service receives a game command from a remote gaming terminal. The receipt of the game command may be directly received over a network by a gaming card, such as when the remote gaming card service is implemented within that gaming card. Alternatively, the receipt of the game command may be indirectly received over the network by a gaming card, such as when the remote gaming card service is implemented within an intermediate device or a gaming processor system.

In another embodiment, at 311, the game command may be directed to a specific gaming card, after being received, in response to an identity associated with the remote gaming terminal. For example, if the remote gaming card service is implemented within an intermediate device or gaming system processor which is managing interactions for a plurality of distinct remote gaming terminals and gaming cards, then the identity of the remote gaming terminal, or perhaps the game command itself, allows the remote gaming card service to specifically select the appropriate gaming card to handle the game command. This may be achieved with mappings managed by the remote gaming card service and/or intermediate device or gaming system processor.

In a similar manner and in yet another embodiment, at 312, the remote gaming card service may identify a specific or appropriate gaming application to process the game command based on the syntax of the gaming command itself and/or based on an identity associated with the remote gaming terminal. In some cases published or communicated features associated with a particular remote gaming terminal may also be dynamically interpreted by the remote gaming service to resolve the specific identity of a particular gaming card and thus the particular identity of an appropriate gaming application.

Accordingly, the game command may actually be used to select the gaming application. For example, a player interacting with the remote gaming terminal may activate an on-screen selection that generates a game command; that game command is transmitted over the network to the remote gaming card service and based on the syntax of that command, the identity of the remote gaming terminal, or published features associated with the remote gaming terminal an appropriate gaming application is initiated for game play. Moreover, each gaming card may be associated with policies managed by the gaming card service that identify allowable gaming applications for each gaming card.

At 320, after the remote gaming card service has identified the gaming application and optionally the gaming card associated with the received game command, the game command is processed by the appropriate gaming application. In an embodiment, the gaming application may actually be dynamically altered or modified prior to processing the game command. In other words, the remote gaming card service may check for updates to the gaming application before initiating the gaming application or before passing the game command to the gaming application. In this way, versioning, enhancements, bug fixes, etc. can be implemented prior to processing the game command.

In another embodiment, at 321, the remote gaming card service may actually access gaming application data, game state, interactions, and results primarily from memory and/or storage maintained within the appropriate remote gaming card. In this way, very little memory or storage is consumed on the gaming system processor, which includes a plurality of additional gaming cards.

At 330, the remote gaming card service transmits the result produced by the gaming application back to the remote gaming terminal. That is, the gaming application's execution state is altered based on processing the game command on the gaming card or on the gaming system processor. The state is communicated to or intercepted by the gaming card service and forwarded along to the remote gaming terminal.

In an embodiment, the remote gaming card service may also translate the result into a format that is more readily processed or recognized by the remote gaming terminals. Thus, generic gaming terminals with generic processing may be developed to interface with a plurality of gaming applications. This can be achieved by the remote gaming card service acting as a translation service between the remote gaming terminals and legacy gaming cards and legacy gaming applications. In an embodiment, the generic data format is extensible markup language (XML).

According to another embodiment, at 331, the gaming application may be dynamically replaced with a different gaming application. This may be achieved by removing the gaming card from a particular slot within the gaming system processor, where that particular slot was mapped to the remote gaming terminal. In that slot, the different game may be dynamically inserted. In this manner, gaming applications may be dynamically swamped in and out of the gaming system processor permitting different gaming applications to be associated with a same remote gaming terminal. In some cases, the dynamic replacement may also be accomplished via download over the network.

In still other embodiments, at 340, the remote gaming card service may simultaneously transmit a single result produced by a single gaming application to one or more additional remote gaming terminals. This may occur when two or more remote gaming terminals are playing the same gaming application. Therefore, players at different gaming terminals may play new and novel wagering games against one another. Communications are sent from the gaming terminals and intercepted by the remote gaming card service where they are forwarded to the proper gaming application(s) and result simultaneously transmitted by the remote gaming card service back to each of the remote gaming terminals. This provides a unique and novel gaming experience and provides for the development of novel wagering games.

The same experience may be achieved in an alternative manner, such that each unique gaming terminal interacts with its own distinct gaming card and gaming application, the two separate instances of gaming applications then interact or synchronize with one another to permit two players to competitively play against one another.

One now appreciates how gaming may be achieved in a remote fashion. The techniques presented herein demonstrate how gaming applications and cards may be decoupled from the actual gaming terminals that are manipulated by players. This decoupled interaction and architecture permits better management and distribution of gaming applications throughout a gaming establishment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system, comprising:

at least one portable gaming card coupled to a gaming system processor, the gaming system processor having a plurality of slots, each slot receives a particular portable gaming card, and each slot has its own unique address within the gaming system processor and each slot maps that slot to a particular gaming terminal, the mapping defined in tables, some policies group selective gaming terminals to a single portable gaming card via a particular slot of the gaming system processor, and each of the portable gaming cards includes its own memory, storage, and processor and a single unique gaming application that is executed on that specific portable gaming card, the unique gaming application is a wagering game, and each of the portable gaming cards is capable of being dynamically removed from its slot and dynamically plugged into another slot; and a particular gaming terminal selected from the plurality of gaming terminals, the particular gaming terminal is mapped to a specific one of the slots, which the at least one portable gaming card is plugged into, the at least one portable gaming card and the particular gaming terminal are remote from one another and communicate with one another over a network, and a unique and particular gaming application resides and executes on the at least one portable gaming card in cooperation with the gaming system processor, and results from the processing are communicated to and driven by interactions with the particular gaming terminal over the network.

2. The system of claim 1 further comprising, an intermediate device that facilitates communications among the particular gaming terminal, the at least one portable gaming card, and the gaming system processor.

3. The system of claim 2, wherein the intermediate device is at least one of a router, a proxy, a firewall, and a server.

4. The system of claim 2, wherein the intermediate device provides at least one of authentication and encryption services for communications among the particular gaming terminal, the at least one portable gaming card, and the gaming system processor.

5. The system of claim 1, wherein the gaming application is adapted to be at least one of dynamically modified, dynamically added, dynamically downloaded, and dynamically deleted from the at least one portable gaming card.

6. The system of claim 1, wherein the at least one portable gaming card is adapted to be moved from one slot to another interface slot within the gaming system processor and dynamically associated with a different gaming terminal.

7. The system of claim 1, wherein the gaming system processor is a rack or jukebox device adapted to house the at least one portable gaming card and a plurality of additional portable gaming cards, and wherein each of the plurality of additional portable gaming cards communicate remotely with the particular gaming terminal or with other one of the plurality of terminals.

8. A method, comprising:

transmitting, via a particular gaming terminal, an interaction to a remote gaming card, the remote gaming card is interfaced to a gaming system processor via a unique slot of the gaming system processor, the unique slot having a unique address, and the gaming system processor is also interfaced with a plurality of additional remote gaming cards via other slots of the gaming system processor, and the unique slot of the gamming system processor is mapped to the particular gaming terminal via a unique address for the slot and a table having the associating between the slot and its address with the particular gaming terminal, the remote gaming card includes its own memory, storage, and processor and executes a single and unique gaming application for a wagering game on behalf of the particular gaming terminal; and receiving, at the particular gaming terminal, a result from the remote gaming card in response to the interaction; and presenting, at the particular gaming terminal, a modified presentation on a display in response to the result.

9. The method of claim 8, wherein transmitting further includes transmitting the interaction over the network to an intermediate device that identifies and interacts directly with the remote gaming card.

10. The method of claim 8, wherein transmitting further includes at least one of wirelessly transmitting the interaction over a wireless network and transmitting the interaction over a wired network.

11. The method of claim 8 further comprising, implementing security procedures for transmitting the interaction and for receiving the result.

12. The method of claim 8 further comprising, dynamically selecting the gaming application associated with the remote gaming card, and wherein selecting determines an identity of the remote gaming card before transmitting the interaction.

13. The method of claim 8 further comprising, processing at least one of video data, graphical data, audio data, image data, and textual data in response to the result.

14. The method of claim 8 further comprising, using the interaction transmitted to the remote gaming card and the result received from the remote gaming card to interactively and dynamically play the wagering game.

15. A method, comprising:

receiving, at a portable gaming card having its own memory, storage, and processor, a game command that originates from a remote gaming terminal over a network;

processing, by a gaming application residing and executing on the portable gaming card, the game command, and the portable gaming card is interfaced to a gaming system processor via a slot having a unique address that maps via a table using the unique address for the slot having the portable gaming card to the remote gaming terminal, the gaming system processor includes a plurality of additional portable gaming cards each additional portable gaming card associated with its own unique slot in the gaming system processor, each additional portable gaming card is mapped via the table using an address for that portable card's slot to a specific remote gaming terminal selected from a plurality of remote gaming terminals, the mapping is achieved via a specific slot of the gaming system processor that a particular portable gaming card is plugged into and each additional portable gaming card including its own memory, storage, processor, and unique gaming application that processes on that additional portable gaming card, and each additional portable and the portable gaming card capable of being dynamically removed from and dynamically plugged into slots for the gaming system processor; and transmitting a result produced by the gaming application to the remote gaming terminal.

16. The method of claim 15 further comprising, maintaining data associated with the gaming application, the game command, and the result within the memory or the storage associated with the portable gaming card.

17. The method of claim 15 further comprising, dynamically directing the game command to the portable gaming card within and at a particular slot of the gaming system processor in response to an identity associated with the remote gaming terminal.

18. The method of claim 15 further comprising, simultaneously transmitting the result to at least one additional remote gaming terminal selected from the plurality of remote gaming terminals and one of the additional portable gaming cards.

19. The method of claim 15 further comprising, identifying the gaming application in response to at least one of features associated with the remote gaming terminal, the gaming command, and an identity associated with the remote gaming terminal.

20. The method of claim 15, further comprising dynamically replacing the gaming application with a different gaming application by dynamically associating the gaming terminal with one of the additional gaming cards of the gaming system processor.

* * * * *

UNITED STATES PATENT AND TRADEMARK OFFICE

CERTIFICATE OF CORRECTION

PATENT NO. : 8,663,010 B2
APPLICATION NO. : 11/335440
DATED : March 4, 2014
INVENTOR(S) : Alfred Thomas et al.

It is certified that error appears in the above-identified patent and that said Letters Patent is hereby corrected as shown below:

In the Claims:

On Column 11, Line 12 (Claim 15, Line 17), please insert the word --gaming-- between “portable” and “card’s”.

Signed and Sealed this
Eighth Day of July, 2014

Michelle K. Lee
*Deputy Director of the United States Patent and Trademark Office*